(12) United States Patent
Zhang et al.

(10) Patent No.: US 12,553,620 B2
(45) Date of Patent: Feb. 17, 2026

(54) GAS HEATER

(71) Applicant: SHINERICH INDUSTRIAL LTD., Shenzhen (CN)

(72) Inventors: Guangrong Zhang, Shenzhen (CN); Hui Xie, Shenzhen (CN); Guoming Yuan, Shenzhen (CN)

(73) Assignee: SHINERICH INDUSTRIAL LTD., Shenzhen (CN)

( * ) Notice: Subject to any disclaimer, the term of this patent is extended or adjusted under 35 U.S.C. 154(b) by 370 days.

(21) Appl. No.: 18/319,619

(22) Filed: May 18, 2023

(65) Prior Publication Data
US 2024/0263805 A1 Aug. 8, 2024

Related U.S. Application Data

(63) Continuation of application No. PCT/CN2023/087918, filed on Apr. 12, 2023.

(30) Foreign Application Priority Data

Feb. 2, 2023 (CN) .......................... 202310081186.7

(51) Int. Cl.
*F23D 14/14* (2006.01)
*F23N 1/00* (2006.01)
(Continued)

(52) U.S. Cl.
CPC ........... *F24D 15/02* (2013.01); *F23D 14/145* (2013.01); *F23N 1/005* (2013.01); *F23N 3/045* (2013.01);
(Continued)

(58) Field of Classification Search
CPC ........ F24D 15/02; F24D 14/145; F23N 1/045; F23N 5/045; F23N 2235/24; F23N 2235/02
(Continued)

(56) References Cited

U.S. PATENT DOCUMENTS

| | | | | |
|---|---|---|---|---|
| 1,921,152 A | * | 8/1933 | Caldwell ................. | F23C 99/00 431/189 |
| 3,934,572 A | * | 1/1976 | Teague, Jr. .............. | F24C 3/045 126/85 B |

(Continued)

FOREIGN PATENT DOCUMENTS

| | | |
|---|---|---|
| CN | 2390122 Y | 8/2000 |
| CN | 2502163 Y | 7/2002 |

(Continued)

OTHER PUBLICATIONS

International Search Report and Written Opinion issued in corresponding PCT Application No. PCT/CN2023/087918, dated Oct. 11, 2023.

(Continued)

*Primary Examiner* — Avinash A Savani
(74) *Attorney, Agent, or Firm* — Westbridge IP LLC

(57) ABSTRACT

Disclosed is a gas heater, including: a gas bottle for storing a gas, a valve body connector, and a burner. A cavity is provided in the valve body connector, both the regulator and the safety valve are communicated with the cavity, the regulator is connected to the gas bottle, the valve body connector is provided with a valve nozzle, and the valve nozzle is communicated with the cavity. An air inlet pipe is provided between the burner and the valve body connector, one end of the air inlet pipe is connected to the valve nozzle, another end of the air inlet pipe is connected to the burner. The gas enters the cavity of the valve body connector through the regulator, and enters the air inlet pipe through the valve nozzle.

9 Claims, 8 Drawing Sheets

(51) Int. Cl.
*F23N 3/04* (2006.01)
*F24D 15/02* (2006.01)

(52) U.S. Cl.
CPC ...... *F23N 2235/02* (2020.01); *F23N 2235/24* (2020.01)

(58) Field of Classification Search
USPC .............................................. 126/85 R, 92 B
See application file for complete search history.

(56) References Cited

U.S. PATENT DOCUMENTS

| | | | | |
|---|---|---|---|---|
| 4,624,241 | A * | 11/1986 | Cherryholmes | F24C 15/22 431/329 |
| 5,026,273 | A * | 6/1991 | Cornelison | F23C 13/00 502/527.22 |
| 6,575,154 | B1 * | 6/2003 | Freeman, Jr. | F24C 3/042 126/41 R |
| 6,619,281 | B2 * | 9/2003 | Resmo | F24C 1/12 431/344 |
| 6,745,759 | B2 | 6/2004 | Bossler | |
| 2006/0054160 | A1 * | 3/2006 | Borowske | F24B 3/00 126/512 |
| 2008/0227045 | A1 * | 9/2008 | Deng | F23K 5/007 431/258 |

FOREIGN PATENT DOCUMENTS

| | | |
|---|---|---|
| CN | 2521529 Y | 11/2002 |
| CN | 1409048 A | 4/2003 |
| CN | 200946836 Y | 9/2007 |
| CN | 101118064 A | 2/2008 |
| CN | 203395977 U | 1/2014 |
| CN | 104214817 A | 12/2014 |
| CN | 204227524 U | 3/2015 |
| CN | 206572511 U | 10/2017 |
| CN | 108331944 A | 7/2018 |
| CN | 210241745 U | 4/2020 |
| CN | 114439979 A | 5/2022 |
| CN | 216520927 U | 5/2022 |
| CN | 114776836 A | 7/2022 |
| CN | 219243687 U | 6/2023 |
| DE | 202012100591 U1 | 5/2013 |
| GB | 752141 A | 7/1956 |
| JP | 2829578 B2 | 11/1998 |

OTHER PUBLICATIONS

First Office Action issued in counterpart Chinese Patent Application No. 202310081186.7, dated Jun. 20, 2025.

* cited by examiner

GAS HEATER

CROSS-REFERENCE TO RELATED APPLICATIONS

This application is a continuation application of International Application No. PCT/CN2023/087918, filed on Apr. 12, 2023, which claims priority to Chinese Patent Application No. 202310081186.7, filed on Feb. 2, 2023. The disclosures of the above-mentioned applications are incorporated herein by reference in their entireties.

TECHNICAL FIELD

The present disclosure relates to the technical field of heating equipment, and in particular to a gas heater.

BACKGROUND

The present desktop heater has many pipelines and the process is complicated. The regulator, the safety valve and the valve nozzle are all connected by semi-rigid pipes.

There are many joints, and the assembly and maintenance processes are complicated. According to technical standard, the gas desktop heater is limited by the 1-pound propane gas bottle, and the actual calorific value is lower than 10,000 BTU/HR, thus users often feel neither hot nor warm.

SUMMARY

The main purpose of the present disclosure is to provide a gas heater, aiming to solve the technical problems that there are too many pipelines, too many joints, and the assembly and maintenance processes are complicated in the current desktop heaters.

To achieve the above purpose, the present disclosure provides a gas heater, including: a gas bottle for storing a gas, a valve body connector, and a burner.

A cavity is provided in the valve body connector, the valve body connector is respectively connected to a regulator and a safety valve, both the regulator and the safety valve are communicated with the cavity, the regulator is connected to the gas bottle, the gas is configured to enter the cavity of the valve body connector through the regulator, the valve body connector is provided with a valve nozzle, and the valve nozzle is communicated with the cavity.

An air inlet pipe is provided between the burner and the valve body connector, one end of the air inlet pipe is connected to the valve nozzle, another end of the air inlet pipe is connected to the burner, the gas is configured to enter the air inlet pipe through the valve nozzle, the air inlet pipe is provided with a gap for an air to enter, the gas and the air are mixed in the air inlet pipe to form a mixed gas, and the mixed gas is configured to enter the burner through the air inlet pipe to get burned.

In an embodiment, the gas heater also includes: a connection pipe communicated with the valve body connector, at least two gas bottles are provided, the gas bottles are respectively connected to gas bottle joints, the gas bottle joints are respectively connected to two ends of the connection pipe, the gas bottle joint is provided with a rotary member, the rotary member is extended into the connection pipe, the connection pipe is connected to a locking member, the locking member is configured to pass through a side wall of the connection pipe and abut against the rotary member, the rotary member is sleeved with a rotary sealing ring, and the rotary sealing ring is in contact with an inner wall of the connection pipe.

In an embodiment, a passage is provided in the gas bottle joint, the passage passes through the rotary member and is communicated with the connection pipe, a check device is provided in the gas bottle joint, the check device is configured to control the passage to open or close, and the gas is configured to enter the connection pipe through the gas bottle joint.

In an embodiment, the valve body connector is also communicated with a primary fire gas pipe, the burner is provided with a fixed frame, a gas outlet of the primary fire gas pipe is close to the burner, an ignition needle is close to the gas outlet of the primary fire gas pipe for ignition, and an end of the primary fire gas pipe close to the gas outlet and the ignition needle are fixed on the fixed frame.

In an embodiment, an oxygen detection sensor is provided on the fixed frame, the oxygen detection sensor includes a thermocouple and a solenoid valve electrically connected to each other, the thermocouple is fixed on the fixed frame and close to the gas outlet of the primary fire gas pipe, the solenoid valve is arranged in the safety valve, a combustion of the gas generates a heat, the thermocouple generates a current to make the solenoid valve be turned on, and the gas is configured to enter the air inlet pipe through the valve body connector.

In an embodiment, the gas heater also includes: a dump switch, and the solenoid valve and the thermocouple are respectively electrically connected to the dump switch, and a tilt angle of the dump switch is within 45°.

In an embodiment, the burner is provided with two layers of woven meshes, the woven meshes are provided with through holes, a combustion space is formed between the two layers of the woven meshes, the through hole is communicated with the combustion space, and the mixed gas is burned in the combustion space.

In an embodiment, a top of the burner is provided with an upper cover, a bottom of the burner is provided with a lower cover, an edge of the upper cover and an edge of the lower cover are respectively connected to the woven mesh, the air inlet pipe passes through the lower cover to communicate with the burner, the mixed gas is configured to enter the burner through the air inlet pipe, and to enter the combustion space through the through hole.

In an embodiment, the gas heater also includes a burner assembly, the burner assembly includes a protective net and a reflector, the reflector includes a top cover and a wing plate connected to each other, the wing plate is connected to the protective net, the top cover is arranged above the burner, the protective net is arranged around the burner, a side of the protective net away from the wing plate is connected to a bottom plate, the bottom plate is connected to a supporting tube, the supporting tube is sleeved outside the air inlet pipe, an end of the supporting tube away from the bottom plate is connected to a cabinet, the gas bottle and the valve body connector are arranged in the cabinet, a heat shield is provided between the burner and the bottom plate, the heat shield is sleeved outside the air inlet pipe, and the heat shield is connected to one side of the bottom plate close to protective net.

In an embodiment, the woven mesh surrounds to form a cylindrical structure, the upper cover is arranged at a top of the cylindrical structure, the lower cover is arranged at a bottom of the cylindrical structure, a cross-section of the cylindrical structure is in an oval shape, and the top cover is a square structure.

In technical solutions of the present disclosure, both the regulator and the safety valve are connected to the valve body connector to form a combined valve structure, which replaces the connecting copper pipe and the joint between the regulator and the safety valve in the related art. The safety valve is directly connected to the valve nozzle through the cavity, and the air inlet pipe of the burner is directly connected to the valve nozzle, which replaces the copper pipe and the joint between the safety valve and the valve nozzle in the related art. It is easy to assembly and maintain, the process is simple, and the product reliability and process efficiency are greatly improved. In addition, the connection pipe is connected to the gas bottle, two 1-pound gas bottle desktop heaters can be used at the same time, and the calorific value can be increased to 15000BTU/HR, which is 1.5 times higher than that of products in the present market, and the red heat effect of the infrared cover and the heating effect is also increased by 1.5 times.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the related art. Obviously, the drawings in the following description are only part of embodiments of the present disclosure. For those of ordinary skill in the art, other drawings can also be obtained according to the structures shown in these drawings without any creative effort.

Figure 1:
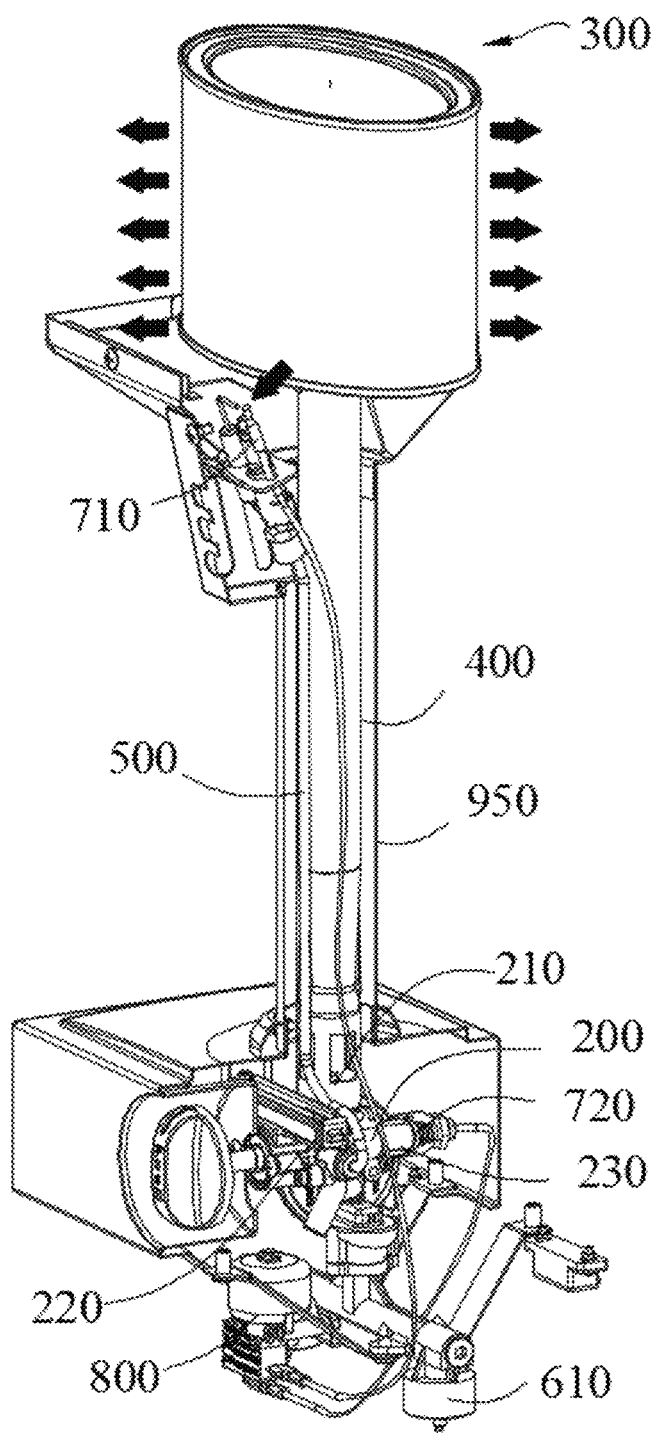
FIG. 1 is a partially sectional structural schematic view of a gas heater according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc., involved in the embodiments of the present disclosure, the directional indications are only used to explain a certain posture as shown in the accompanying drawings. If the specific posture changes, the directional indication also changes accordingly.

In the description of the present disclosure, unless otherwise specified and limited, the terms "installation", "connecting" and "connection" should be understood in a broad sense, for example, it can be a fixed connection, a detachable connection, integrally connected, mechanically connected, electrically connected, directly connected or indirectly connected through an intermediary, and it can be the internal communication of two components. Those skilled in the art can understand the specific meanings of the above terms in the present disclosure according to specific situations.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

The present disclosure provides a gas heater.

In the related art, the present desktop heater has many pipelines and the process is complicated. The regulator, the safety valve and the valve nozzle are all connected by semi-rigid pipes. There are many joints, and the assembly and maintenance processes are complicated. According to technical standard, the gas desktop heater is limited by the 1-pound propane gas bottle, and the actual calorific value is lower than 10,000 BTU/HR, thus users often feel neither hot nor warm.

In order to solve the above technical problem, in technical solutions of the present disclosure, both the regulator and the safety valve are connected to the valve body connector to form a combined valve structure, which replaces the connecting copper pipe and the joint between the regulator and the safety valve in the related art. The safety valve is directly communicated with the valve nozzle through the cavity, and the air inlet pipe of the burner is directly connected to the valve nozzle, which replaces the copper pipe and the joint between the safety valve and the valve nozzle in the related art. It is easy to assembly and maintain, the process is simple, and the product reliability and process efficiency are greatly improved. In addition, the connection pipe is connected to the gas bottle, two 1-pound gas bottle desktop heaters can be used at the same time, and the calorific value can be increased to 15000BTU/HR, which is 1.5 times higher than that of products in the present market, and the red heat effect of the infrared cover and the heating effect is also increased by 1.5 times.

The technical solutions will be described in detail below with the accompanying drawings.

Figure 2:
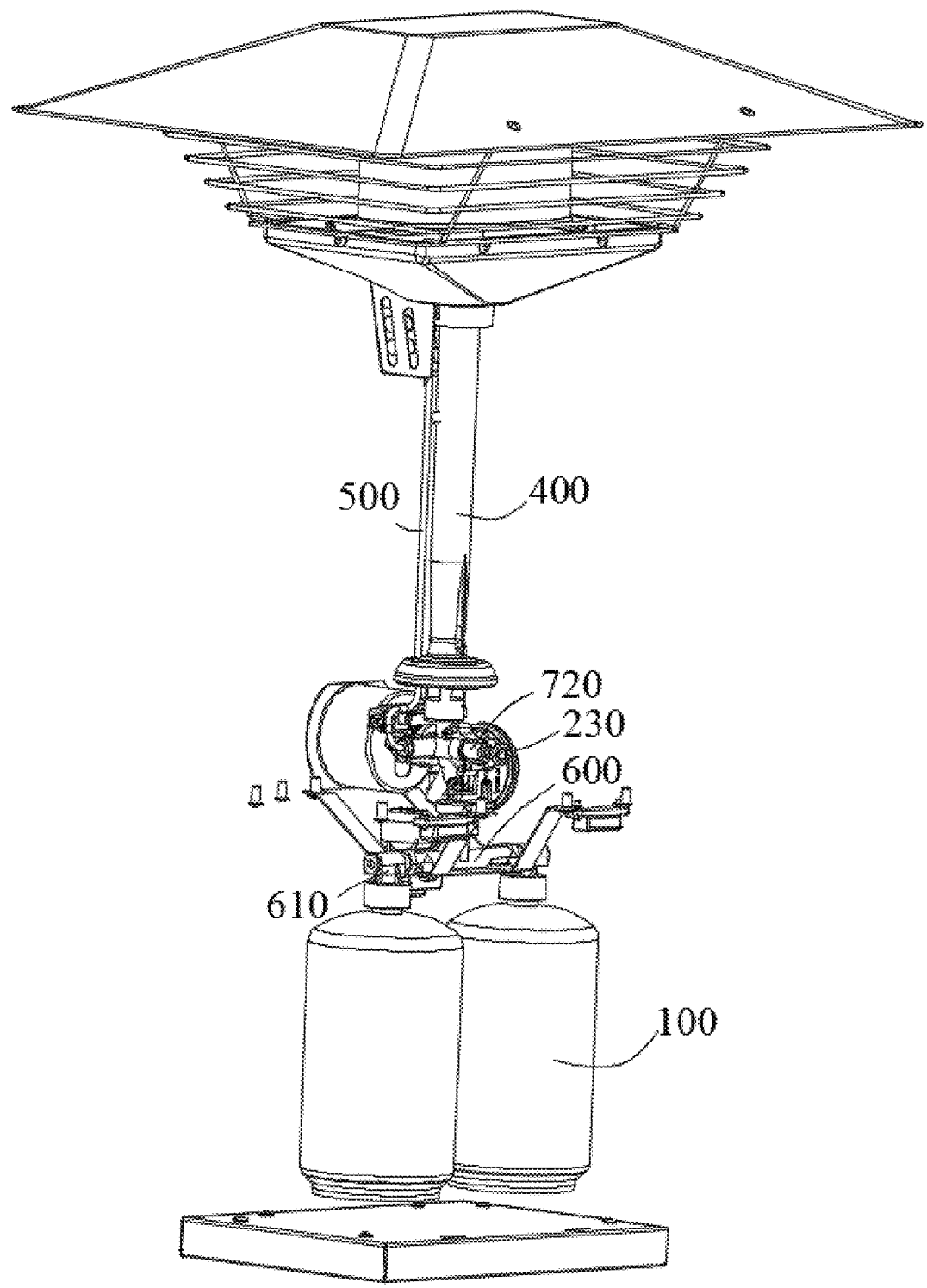
FIG. 2 is a structural schematic view of the gas heater according to an embodiment of the present disclosure.
Figure 3:
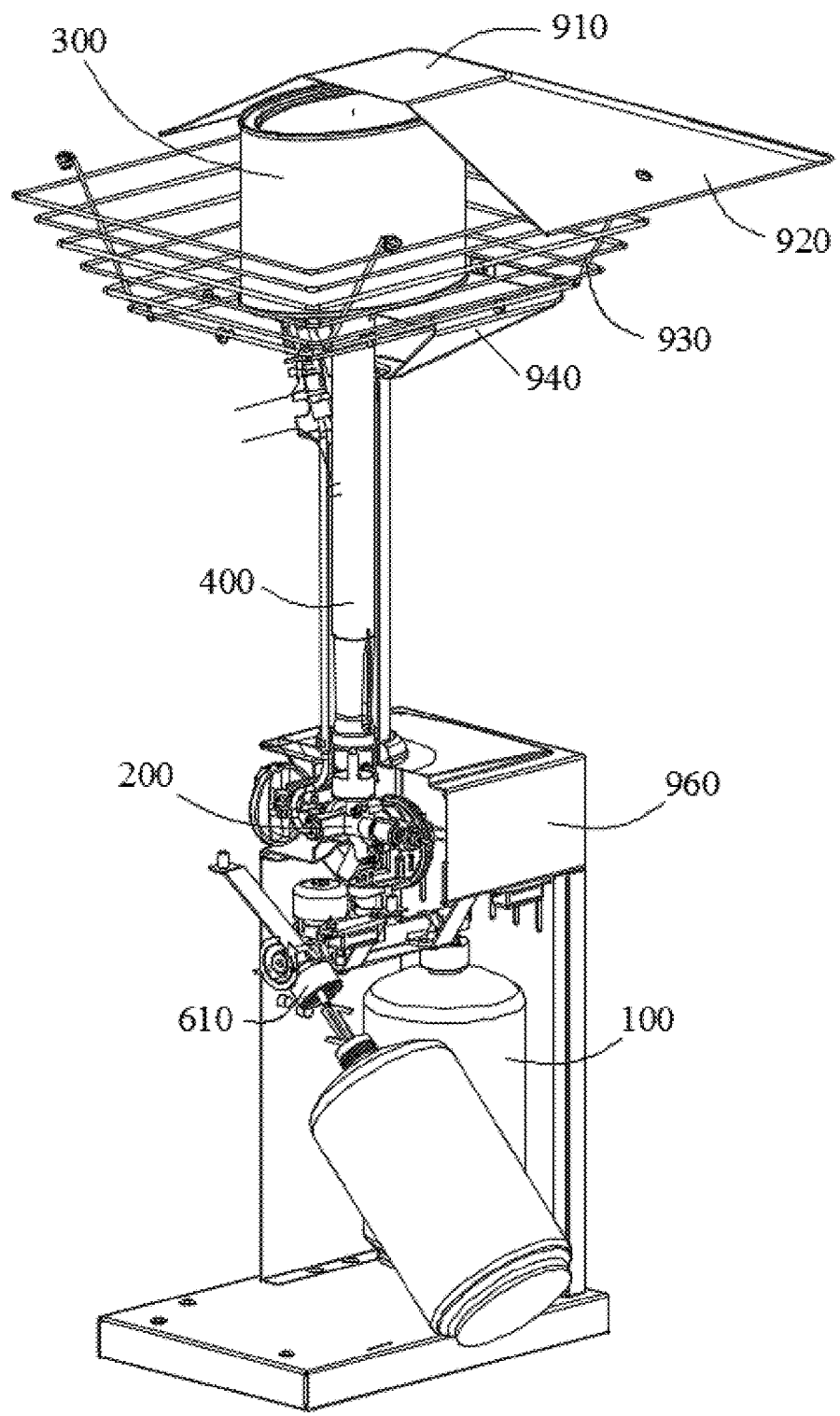
FIG. 3 is a partially sectional structural schematic view of a gas heater according to an embodiment of the present disclosure.
Figure 4:
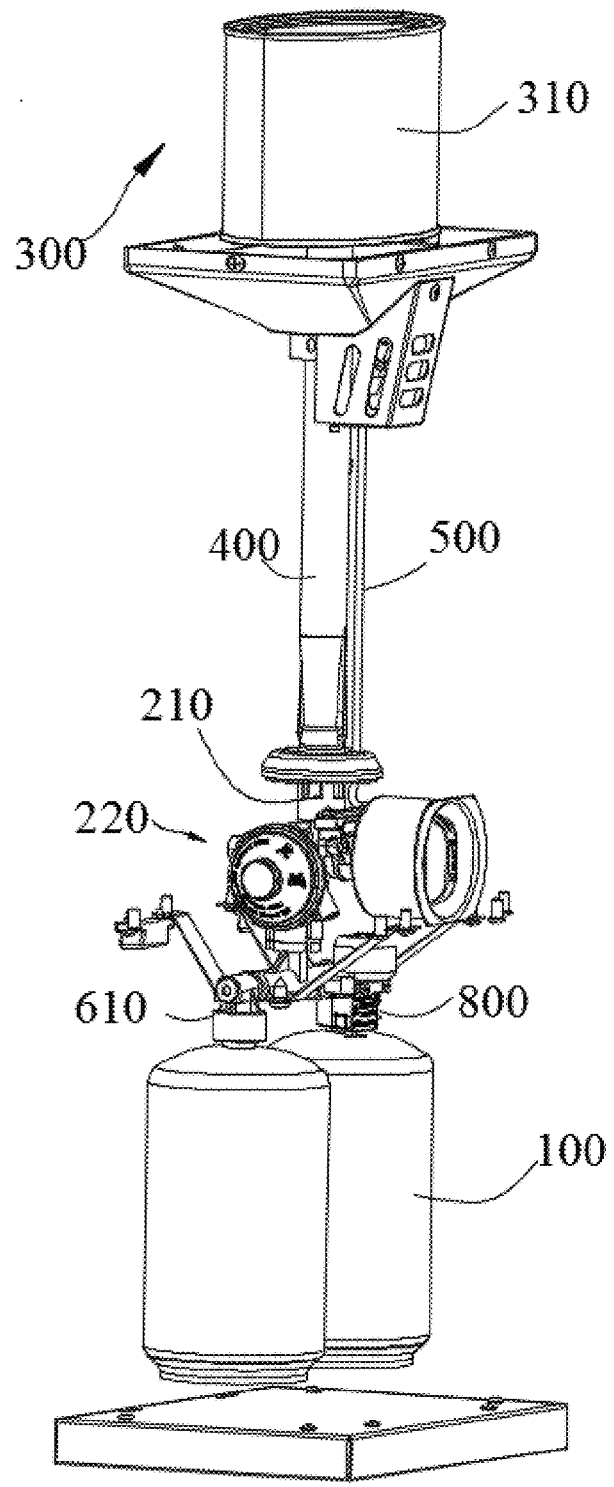
FIG. 4 is a structural schematic view of the gas heater according to an embodiment of the present disclosure.
Figure 5:
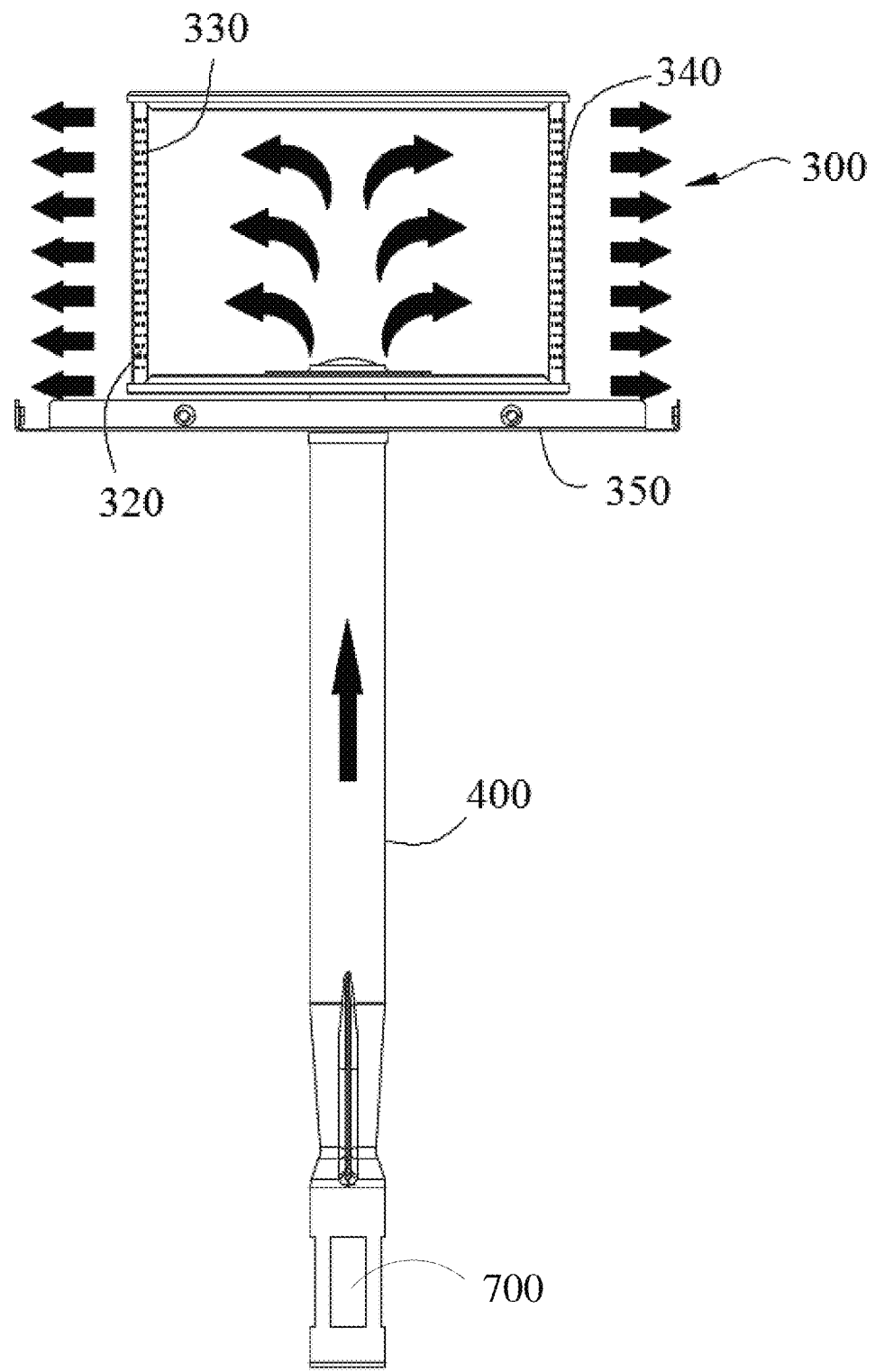
FIG. 5 is a schematic view of a gas circulation and a heat dissipation of the gas heater according to an embodiment of the present disclosure.
Figure 6:
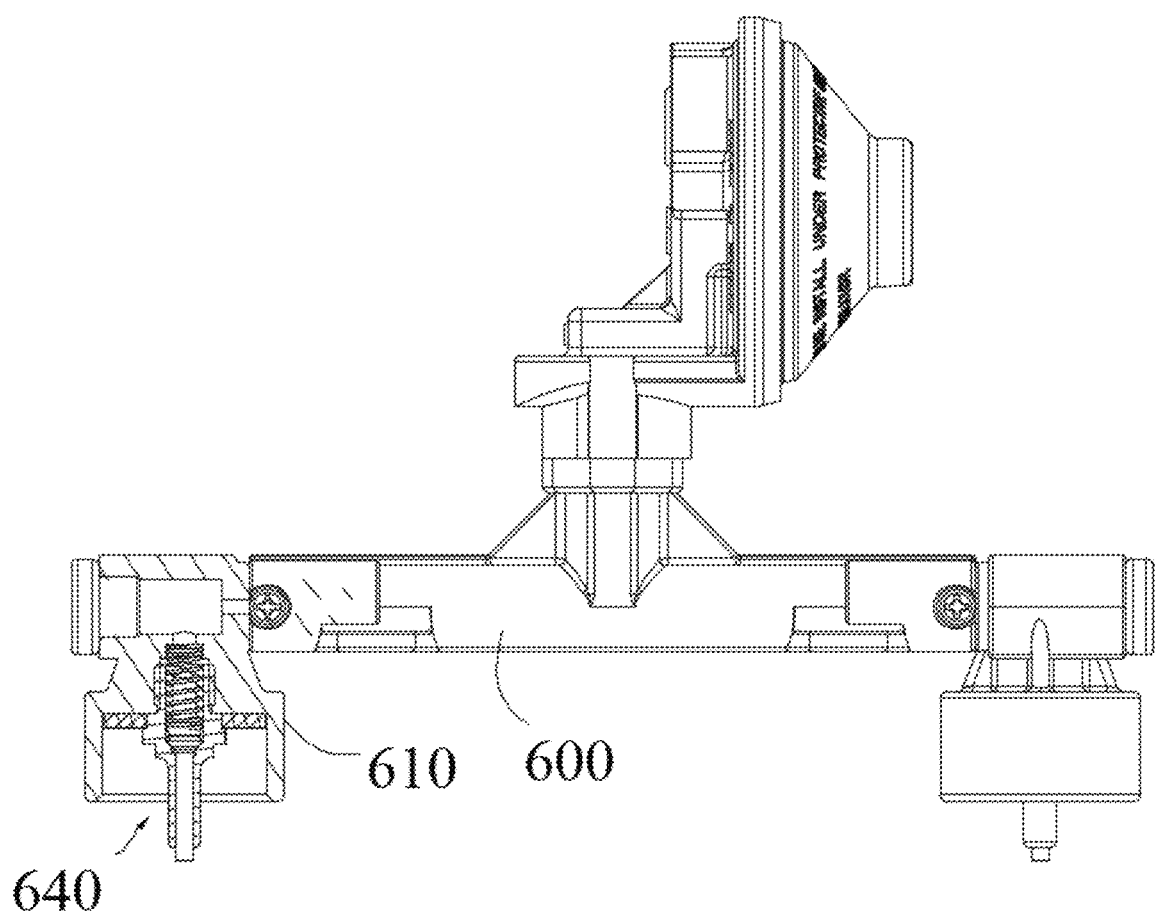
FIG. 6 is a partially sectional structural schematic view of a connection pipe and a gas bottle joint according to an embodiment of the present disclosure.
Figure 7:
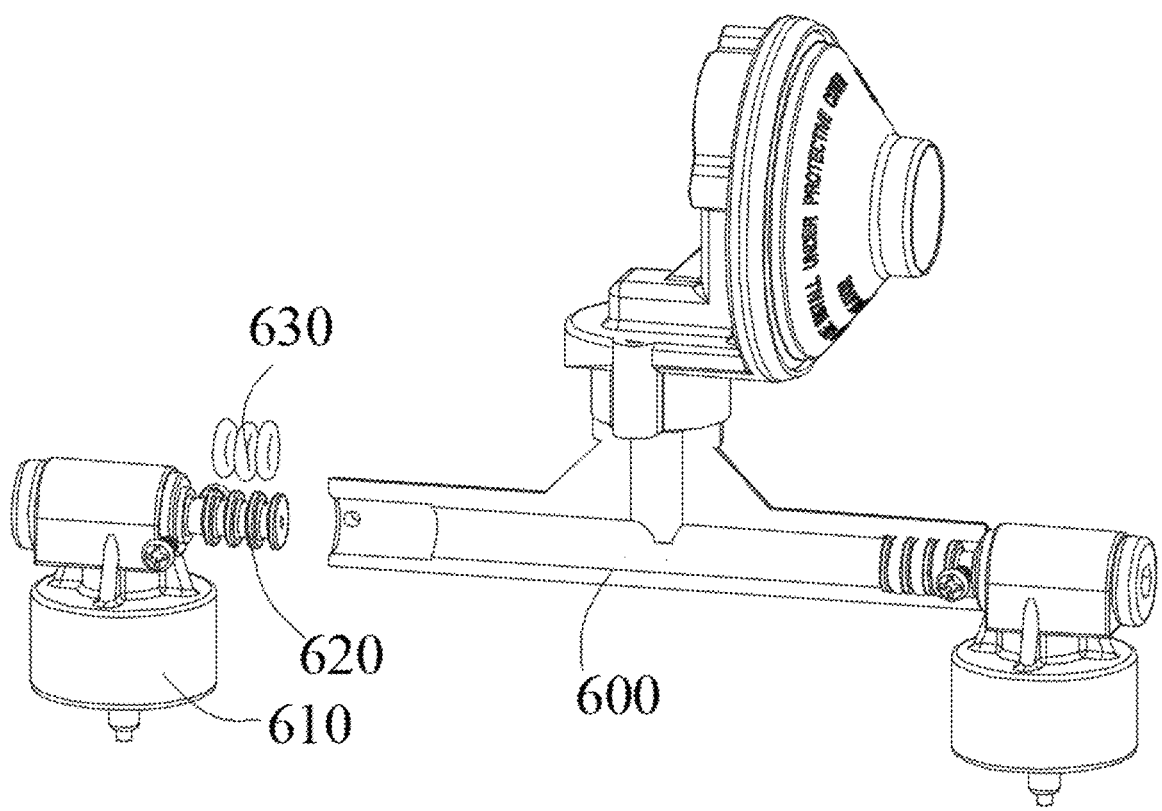
FIG. 7 is a partial explosion schematic view of the gas bottle joint according to an embodiment of the present disclosure.
Figure 8:
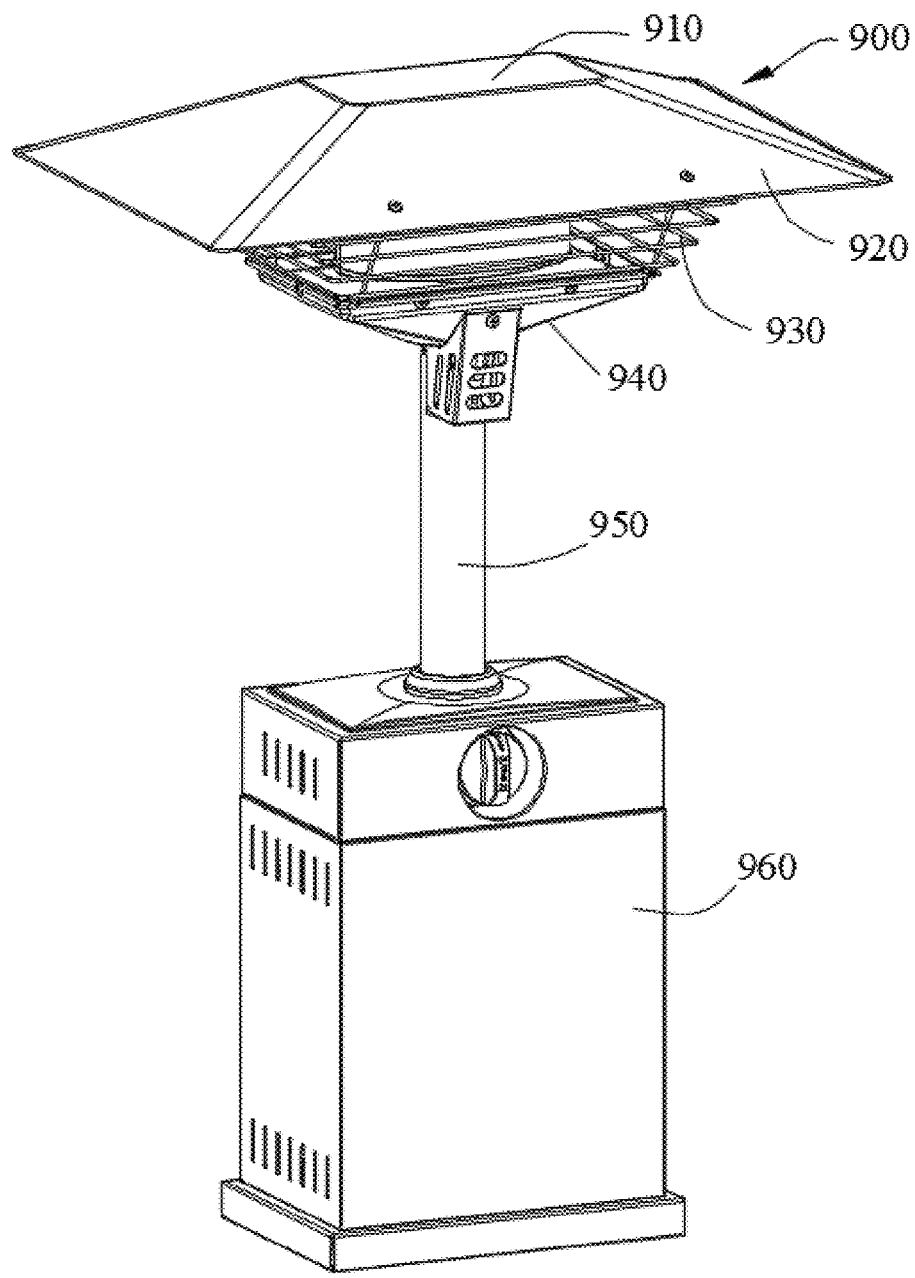
FIG. 8 is a structural schematic view of the gas heater according to an embodiment of the present disclosure.

In an embodiment of the present disclosure, as shown in FIG. 1 to FIG. 8, a gas heater includes a gas bottle 100, a valve body connector 200 and a burner 300.

The gas bottle 100 is configured to store a gas.

A cavity is provided in the valve body connector 200, the valve body connector 200 is respectively connected to a regulator 220 and a safety valve 230, both the regulator 220 and the safety valve 230 are communicated with the cavity, the regulator 220 is connected to the gas bottle 100, the gas enters the cavity of the valve body connector 200 through the regulator 220, the valve body connector 200 is provided with a valve nozzle 210, and the valve nozzle 210 is communicated with the cavity.

An air inlet pipe 400 is provided between the burner 300 and the valve body connector 200. One end of the air inlet pipe 400 is connected to the valve nozzle 210, another end of the air inlet pipe 400 is connected to the burner 300, the gas enters the air inlet pipe 400 through the valve nozzle 210, the air inlet pipe 400 is provided with a gap 700 for an air to enter, the gas and the air are mixed in the air inlet pipe 400 to form a mixed gas, and the mixed gas enters the burner 300 through the air inlet pipe 400 for combustion.

In this embodiment, a propane is stored in the gas bottle 100 as the gas, according to the technical standard specification, the gas bottle 100 is a one-pound propane gas bottle. The gas in the gas bottle 100 enters the burner 300 through the valve body connector 200 and gets burned to generate a heat radiation to achieve an effect of heating. Specifically, the regulator 220 and the safety valve 230 are respectively connected to the valve body connector 200 to form a combined valve body structure. The valve body connector 200 is a multi-way valve structure with multiple joints and a cavity for communication. It can be understood that the regulator 220 is communicated with the safety valve 230 through the cavity of the valve body connector 200, the valve body connector 200 is provided with a valve nozzle 210, the valve nozzle 210 is arranged close to the safety valve 230, and can be directly communicated to the safety valve 230, which eliminates semi-rigid pipes and joints among the valve body connector 200, the valve nozzle 210 and the safety valve 230 in related art, simplifies an assembly and maintenance process, and reduces a risk of a leakage. In a first aspect, the regulator 220 and the safety valve 230 are assembled together to form the valve body connector 200, which is a combined valve body structure, and cancels a connecting copper pipe and a joint between the regulator 220 and the safety valve 230. In a second aspect, the valve nozzle 210 is close to the safety valve 230, the safety valve 230 is communicated to the valve nozzle 210, the air inlet pipe 400 of the burner 300 is directly inserted into the valve nozzle 210, so that the copper pipe and joint between the safety valve 230 and the valve nozzle 210 are canceled, and the reliability of the product and the process efficiency are greatly improved.

In an embodiment, the air inlet pipe 400 is a Venturi air inlet pipe structure, one end of the air inlet pipe 400 is connected to the valve nozzle 210, another end of the air inlet pipe 400 is connected to the burner 300, a sidewall of one end of the air inlet pipe 400 connected to the valve nozzle 210 and close to an end portion is provided with a gap 700 for air supply to enter, and the gas is mixed with the air for a first time in the air inlet pipe 400. The burner 300 is a hollowed structure, an end of the air inlet pipe 400 extends into the burner 300 so that the mixed gas enters the burner 300 for combustion and generates a heat radiation.

Further, the gas heater also includes a connection pipe 600, the connection pipe 600 is communicated with the valve body connector 200, at least two gas bottles 100 are provided, and are respectively connected to gas bottle joints 610. The gas bottle joints 610 are respectively connected to both ends of the connection pipe 600. The gas bottle joint 610 is provided with a rotary member 620, the rotary member 620 extends into the connection pipe 600, the connection pipe 600 is connected to a locking member, the locking member passes through a sidewall of the connection pipe and abuts against the rotary member 620, the rotary member 620 is sleeved with a rotary sealing ring 630, and the rotary sealing ring 630 is in contact with an inner wall of the connection pipe 600.

In reality, an actual calorific value of a one-pound propane gas bottle 100 is lower than 10,000 BTU/HR, thus users often feel neither hot nor warm. In this embodiment, two one-pound propane gas bottles 100 can be used at the same time, and the two one-pound gas bottles 100 can supply gas at the same time, and the calorific value can increase to 15,000 BTU/HR, the infrared heat effect and the heating effect increase by 1.5 times, which brings users a better viewing and heating effect. In this embodiment, the gas bottle joint 610 is threadedly connected to the gas bottle 100, and the connection pipe 600 is communicated with the valve body connector 200. Specifically, the connection pipe 600 is arranged close to the regulator 220 of the valve body connector 200, the gas enters the valve body connector 200 through the gas bottle joint 610, and the regulator 220 is used to adjust the gas flow. The two gas bottle connectors 610 are respectively arranged at two ends of the connection pipe 600, and a middle of the connection pipe 600 is flanged to the valve body connector 200 and locked by screws to ensure a correct direction and position. The rotary member 620 extends out of one side of the gas bottle joint 610, the rotary member 620 is in contact with the inner wall of the connection pipe 600, the rotary member 620 is provided with a spaced compartment at intervals along an axial direction, and each compartment is covered with a rotary sealing ring 630. The rotating sealing ring 630 is in a sealing connection with the inner wall of the connection pipe 600 to avoid the gas leakage.

In the related art, the double gas bottles 100 are connected to the regulator 220 through a standard joint, and any looseness will cause a high pressure leakage, which is very troublesome. There is a contradiction between adjusting the position and tightening a thread of the joint, and a screw pitch will change per rotation, which will easily cause the joint too tight or too loose. In addition, the gas bottle 100 is disassembled at a fixed position, and disassembly requires a high alignment of an axis of the gas bottle 100 and the joint.

The rotary sealing ring 630 is arranged between the rotary member 620 of the gas bottle joint 610 and the connection pipe 600 to achieve sealing, and the rotary member 620 is locked and fixed to the connection pipe through a locking member. In reality, the locking member is a screw or a pin etc. When connecting the gas bottle 100, it can be rotated to a suitable angle to facilitate the operation of disassembling and assembling the gas bottle 100. In this embodiment, the connection pipe 600 adopts a three-way pipe structure, two ends of the connection pipe 600 are respectively connected to two gas bottle joints 610, and the middle position is connected to the air inlet of the regulator 220 through flanges and screws. They merge into the valve body connector 200 through the connection pipe 600. Specifically, the rotary sealing ring 630 adopts a double O-ring sealing structure, the rotary sealing ring 630 is sleeved on the rotary member 620, and the rotary member 620 moves in the connection pipe 600, and the gas bottle joint 610 and the connection pipe 600 can realize relative rotation, so that The gas bottle 100 is rotated at an appropriate angle to facilitate disassembly and assembly of the gas bottle 100.

In an embodiment, a passage is provided in the gas bottle joint 610, the passage passes through the rotary member 620 and is communicated with the connection pipe 600. A check device is provided in the gas bottle joint 610, the check device is used to control the opening and closing of the passage, and the gas enters the connection pipe 600 through the gas bottle joint 610. In this embodiment, a newly developed connection pipe 600 with a rotatable double gas bottles 100 is used, and the gas bottle joint 610 is provided with the check device, which can prevent a gas backflow between two connected gas bottles 100. Specifically, the check device includes a thimble, a spring, a floating rod and a sealing ring. In this embodiment, a gap 700 for circulation is provided between the thimble and the floating rod. The gap 700 is communicated with the passage, the thimble is threadly or clampingly connected to the gas bottle joint 610, the floating rod, the spring and the sealing ring are arranged in the passage, one end of the spring abuts against an inside of the gas bottle joint, another end of the spring abuts against the floating rod, the sealing ring is sleeved on the floating rod, the floating rod is used to close or open the passage, the floating rod is driven to move upward by the gas under a pressure, and the gas is circulated. When the gas reversely flows, the floating rod and the sealing ring will rebound under the action of the spring resulting from a differential pressure, so that the sealing ring and the passage are tightly fitted, the loop is sealed, and the gas backflow is avoided.

In an embodiment, the valve body connector 200 is also communicated with a primary fire gas pipe 500, the burner 300 is provided with a fixed frame, a gas outlet of the primary fire gas pipe 500 is close to the burner 300, an ignition needle is close to the gas outlet of the primary fire gas pipe 500, which is used for ignition, and an end of the primary fire gas pipe 500 close to the gas outlet and the ignition needle are fixed on the fixed frame.

In this embodiment, a diameter of the primary fire and gas pipe 500 is smaller than that of the air inlet pipe 400, the primary fire and gas pipe 500 extend in a same direction and are arranged outside the air inlet pipe 400. One end of the primary fire gas pipe 500 is communicated with the valve body connector 200, the gas enters the primary fire gas pipe and is discharged through the gas outlet. The ignition needle is an electrode ignition needle, the gas in the primary fire gas pipe 500 is ignited by the ignition needle, and the mixed gas in the combustion space is ignited. A knob for controlling a communication between the ignition needle and the primary fire gas pipe 500 is arranged on the valve body connector 200, and the ignition needle is controlled to ignite through a wire. The fixed frame is used to protect and support the primary fire gas pipe 500 and the ignition needle.

In an embodiment, an oxygen detection sensor is also provided on the fixed frame, the oxygen detection sensor includes a the thermocouple 710 and a solenoid valve 720 electrically connected to each other, the thermocouple 710 is fixed on the fixed frame and arranged near the gas outlet of the primary fire pipe 500, the solenoid valve 720 is arranged in the safety valve 230, a current is generated by the thermocouple 710 driven by the heat of the combustion of the gas, the solenoid valve 720 is opened by the current, and the gas enters the air inlet pipe 400 through the valve body connector 200.

In reality, an outdoor desktop heater also has a function of hypoxia protection in order to prevent accidents when used in tents. In this embodiment, an oxygen detection sensor (ODS) component is used to improve a safety performance. Further, the gas heater also includes a dump switch 800, the solenoid valve 720 and the thermocouple 710 are also electrically connected to the dump switch 800, and a tilt angle allowed by the dump switch 800 is within 45°.

In practice, the thermocouple 710 in the ODS component is heated by a heat radiated by an oval burner 300, a current is generated to open the solenoid valve 720, and a gas path is opened stably. At the same time, the ODS component provides a function of hypoxia protection and flameout protection. The hypoxia protection function, that is, when a percent of the oxygen in the air of the environment where the product is used is lower than 16%, or a carbon monoxide is higher than 100 ppm, a blow-off will happen to the primary fire of the primary fire pipe 500, and the thermocouple 710 will lose heat, so that an electric quantity supplied to the solenoid valve 720 on the safety valve 230 gradually decreases, and the solenoid valve 720 is closed to cut off the gas path to ensure a safety of users. When the primary fire is extinguished due to various accidents, the thermocouple 710 will also lose heat, which will also cause the solenoid valve 720 to be insufficiently powered until it is closed, and cut off the gas path. A mechanical dump switch 800 is connected in series in a circuit between the thermocouple 710 and the solenoid valve 720. Once the product tilts more than 45°, the dump switch 800 is open, which will also cause the solenoid valve 720 to close and cut off the gas path.

In an embodiment, the burner 300 is provided with two layers of woven meshes 310, the woven meshes 310 are provided with a through hole, a combustion space 320 is formed between the two layers of woven meshes 310, the through hole is communicated with the combustion space 320, and the mixed gas is burned in the combustion space 320.

In reality, the woven mesh 310 includes an inner woven mesh 330 and an outer woven mesh 340, the outer woven mesh 340 is sleeved on an outer peripheral surface of the inner woven mesh 330, and the combustion space 320 is formed between the inner woven mesh 330 and the outer woven mesh 340. A plurality of through holes are arranged on the inner woven mesh 330 and the outer woven mesh 340, the through holes are communicated with the inside of the burner 300 and the combustion space 320, the mixed gas enters the combustion space 320 through the through holes of the inner woven mesh 330, the mixed gas gets burned in the combustion space 320 and the outer woven mesh 340 is heated, and the heat is radiated to an outside by the through holes of the outer woven mesh 340.

In an embodiment, an upper cover is provided at a top of the burner 300, a lower cover is provided at a bottom of the burner 300, an edge of the upper cover and an edge of the lower cover are respectively connected to the woven mesh 310, the air inlet pipe 400 is communicated with the burner 300 through the lower cover, and the mixed gas enters the burner 300 through the air inlet pipe 400 and enters the combustion space 320 by the through hole.

In reality, the edge of the upper cover and the edge of the lower cover are respectively clamped with the outer woven mesh 340, and two ends of the inner woven mesh 330 can be weldedly connected to or abutted against the upper cover and the lower cover. The end of the air inlet pipe 400 extends to the inside of the burner 300 through the lower cover. It can be understood that the outer peripheral surface of the air inlet pipe 400 is sealed with the lower cover to avoid the leakage of the gas.

In an embodiment, the gas heater further includes a burner head assembly. The burner head assembly includes a protective net 930 and a reflector 900, the reflector 900 includes a top cover 910 and a wing plate 920 connected to each other, the wing plate 920 is connected to the protective net 930, the top cover 910 is arranged above the burner 300, the protective net 930 is arranged around the burner 300, a side of the protective net 930 away from the wing plate 920 is connected to the bottom plate 940, the bottom plate 940 is connected to the supporting tube 950, the supporting tube 950 is sleeved outside the air inlet pipe 400, an end of the supporting tube 950 away from the bottom plate 940 is connected to a cabinet 960, the gas bottle 100 and the valve body connector 200 are arranged in the cabinet 960, a heat shield 350 is also arranged between the burner 300 and the bottom plate 940, the heat shield 350 is sleeved outside the air inlet pipe 400, and the heat shield 350 is also connected to a side of the bottom plate 940 close to the protective net 930.

In this embodiment, the reflector 900 is arranged on an upper part of the burner 300, the top cover 910 is arranged correspondingly to the burner 300, and the wing plate 920 extends downward and around. A bottom of the protective net 930 is fixed on the heat shield 350, a top of the protective net 930 is fixedly connected to the wing plate 920, and the protective net 930 surrounds the outside of the burner 300 to improve the safety of the burner 300. The protective net 930 adopts a frame structure formed of high-temperature-resistant metal strips, including a horizontal rod and a vertical rod. Two ends of the vertical rod is respectively connected to the heat shield 350 and the wing plate 920, and the protective net 930 is fixed between the reflector 900 and the heat shield 350. The bottom plate 940 is obliquely arranged, and is connected to the heat shield 350 and the supporting tube 950. One end of the supporting tube 950 is connected to the bottom plate 940, a fixing ring is connected to an outer wall near another end of the supporting tube 950, and the fixing ring is connected to the top of the cabinet 960. The air inlet pipe 400 also passes through the heat shield 350, a certain distance is between the heat shield 350 and the lower cover, and the heat shield 350 is fixed on an outer peripheral surface of the air inlet pipe 400. In addition, both the heat shield 350 and the bottom plate 940 are provided with openings communicated with the primary fire gas pipe 500 to ignite the mixed gas. In a specific implementation process, the connection pipe 600 is also provided with a bracket, and the bracket includes a supporting plate and a supporting bar. Specifically, two supporting bars are provided and are respectively fixed on the supporting plate. The supporting plate is connected to the connection pipe 600, the supporting plate is provided with an arc-shaped groove mated with the connection pipe 600, the connection pipe 600 is clipped in the groove, and the connection pipe 600 can also be connected to an upper surface of the supporting plate through a structure such as a clamp. The supporting bar adopts a V-shaped structure, a bottom of the supporting bar is straightly arranged and attached to the supporting plate, and the supporting bar is fixedly connected to the supporting plate through a screw or a rivet. It can be understood that, in order to improve a strength of the bracket, the supporting plate is integrally formed with the supporting bar. In addition, a mechanical dump switch 800 is also fixed on a side of the supporting plate through the screw. In this way, the connection pipe 600 is connected to the cabinet 960 through the bracket, which improves a stability of the connection, further ensures a stability of the connection between the connection pipe 600 and the gas bottle 100, and improves the safety of the gas heater.

In this embodiment, the cabinet 960 is divided into an upper body and a lower body, a space formed around the upper body is used to place the valve body connector 200, and a space formed around the lower body is used to place the gas bottle 100. In addition, the knob extends out of an outer wall of the upper body, which facilitates an operation and a control of the gas heater. A bottom of the cabinet 960 is provided with a base, which serves as a stable support. In addition, in order to facilitate the disassembly and installation of the gas bottle 100 and the gas bottle joint 610, in the specific implementation process, the gas bottle 100 is in a suspended state after installation, that is, a certain distance is between the bottom of the gas bottle 100 and the base.

In this embodiment, the woven mesh 310 surrounds to form a cylindrical structure, an upper cover is arranged on a top of the cylindrical structure, a lower cover is arranged on a bottom of the cylindrical structure, a cross section of the cylindrical structure is in an oval shape, and the top cover 910 is in a square shape. The burner 300 suitable for a rectangular product is not provided in the market, and the common ones in the market are all circular structures, and the heat radiation range and the shape do not meet the requirements. It can be understood that the top cover 910 corresponding to the burner 300 with an oval cross section is also an oval structure. The product of the burner 300 has a rectangular appearance, and the reflector 900 on the top and the base below both have a rectangular appearance.

After the gas bottle 100 is installed, the knob can be turned to open the gas path, the knob is connected to the valve body connector 200, and the gas enters from the gas bottle joint 610, passes through the regulator 220 and the safety valve 230, and then exhausts through the valve nozzle 210. The gas enters the gas inlet pipe 400 to get mixed with sufficient air for the first time, and enters a four-mesh woven mesh in the inner layer of the burner 300 to get fully mixed for the second time, then the gas is evenly output from the surrounding through holes into the combustion space 320 between the inner woven mesh 330 and the outer woven meshes 340 to get fully combusted, and the surrounding air is further absorbed and replenished through the through holes. The outer oval woven mesh is heated by the heat from the combustion to be stably in a blazing infrared state, creating an outdoor radiant source. The oval infrared radiation source continuously radiates the heat to heat surrounding objects and the air. A radiation range in a high state can reach an oval area of 1.5 meters around.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of the present disclosure.

What is claimed is:
1. A gas heater, comprising:
a gas bottle for storing a gas;
a valve body connector, wherein a cavity is provided in the valve body connector, the valve body connector is respectively connected to a regulator and a safety valve, both the regulator and the safety valve are communicated with the cavity, the regulator is connected to the gas bottle, the gas is configured to enter the cavity of the valve body connector through the regulator, the valve body connector is provided with a valve nozzle, and the valve nozzle is communicated with the cavity;

a burner, wherein an air inlet pipe is provided between the burner and the valve body connector, one end of the air inlet pipe is connected to the valve nozzle, another end of the air inlet pipe is connected to the burner, the gas is configured to enter the air inlet pipe through the valve nozzle, the air inlet pipe is provided with a gap for an air to enter, the gas and the air are mixed in the air inlet pipe to form a mixed gas, and the mixed gas is configured to enter the burner through the air inlet pipe to get burned; and a connection pipe, wherein the connection pipe is communicated with the valve body connector, at least two gas bottles are provided, the gas bottles are respectively connected to gas bottle joints, the gas bottle joints are respectively connected to two ends of the connection pipe, the gas bottle joint is provided with a rotary member, the rotary member is extended into the connection pipe, the connection pipe is connected to a locking member, the locking member is configured to pass through a side wall of the connection pipe and abut against the rotary member, the rotary member is sleeved with a rotary sealing ring, and the rotary sealing ring is in contact with an inner wall of the connection pipe.

2. The gas heater of claim 1, wherein a passage is provided in the gas bottle joint, the passage passes through the rotary member and is communicated with the connection pipe, a check device is provided in the gas bottle joint, the check device is configured to control the passage to open or close, and the gas is configured to enter the connection pipe through the gas bottle joint.

3. The gas heater of claim 1, wherein the valve body connector is further communicated with a primary fire gas pipe, the burner is provided with a fixed frame, a gas outlet of the primary fire gas pipe is close to the burner, an ignition needle is close to the gas outlet of the primary fire gas pipe for ignition, and an end of the primary fire gas pipe close to the gas outlet and the ignition needle are fixed on the fixed frame.

4. The gas heater of claim 3, wherein an oxygen detection sensor is provided on the fixed frame, the oxygen detection sensor comprises a thermocouple and a solenoid valve electrically connected to each other, the thermocouple is fixed on the fixed frame and close to the gas outlet of the primary fire gas pipe, the solenoid valve is arranged in the safety valve, a combustion of the gas generates a heat, the thermocouple generates a current to make the solenoid valve be turned on, and the gas is configured to enter the air inlet pipe through the valve body connector.

5. The gas heater of claim 4, further comprising:
a dump switch,
wherein the solenoid valve and the thermocouple are respectively electrically connected to the dump switch, and a tilt angle of the dump switch is within 45°.

6. The gas heater of claim 1, wherein the burner is provided with two layers of woven meshes, the woven meshes are provided with through holes, a combustion space is formed between the two layers of the woven meshes, the through hole is communicated with the combustion space, and the mixed gas is burned in the combustion space.

7. The gas heater of claim 6, wherein a top of the burner is provided with an upper cover, a bottom of the burner is provided with a lower cover, an edge of the upper cover and an edge of the lower cover are respectively connected to the woven mesh, the air inlet pipe passes through the lower cover to communicate with the burner, the mixed gas is configured to enter the burner through the air inlet pipe, and to enter the combustion space through the through hole.

8. The gas heater of claim 7, further comprising:
a burner assembly,
wherein the burner assembly comprises a protective net and a reflector, the reflector comprises a top cover and a wing plate connected to each other, the wing plate is connected to the protective net, the top cover is arranged above the burner, the protective net is arranged around the burner, a side of the protective net away from the wing plate is connected to a bottom plate, the bottom plate is connected to a supporting tube, the supporting tube is sleeved outside the air inlet pipe, an end of the supporting tube away from the bottom plate is connected to a cabinet, the gas bottle and the valve body connector are arranged in the cabinet, a heat shield is provided between the burner and the bottom plate, the heat shield is sleeved outside the air inlet pipe, and the heat shield is connected to one side of the bottom plate close to protective net.

9. The gas heater of claim 8, wherein the woven mesh surrounds to form a cylindrical structure, the upper cover is arranged at a top of the cylindrical structure, the lower cover is arranged at a bottom of the cylindrical structure, a cross-section of the cylindrical structure is in an oval shape, and the top cover is a square structure.

* * * * *